United States Patent
Avermeyer et al.

(10) Patent No.: US 8,747,725 B2
(45) Date of Patent: Jun. 10, 2014

(54) MANIFOLD-TYPE DIE FOR THE PRODCUTION OF A MULTILAYER BLOWN FILM

(75) Inventors: Ansgar Avermeyer, Georgsmarienhuette (DE); Klemens Sensen, Lengerich (DE); Martin Backmann, Lengerich (DE)

(73) Assignee: Windmoeller & Hoelscher KG, Lengerich (DE)

( * ) Notice: Subject to any disclaimer, the term of this patent is extended or adjusted under 35 U.S.C. 154(b) by 397 days.

(21) Appl. No.: 12/449,726

(22) PCT Filed: Jan. 29, 2008

(86) PCT No.: PCT/EP2008/051055
§ 371 (c)(1),
(2), (4) Date: Aug. 24, 2009

(87) PCT Pub. No.: WO2008/101768
PCT Pub. Date: Aug. 28, 2008

(65) Prior Publication Data
US 2010/0320651 A1    Dec. 23, 2010

(30) Foreign Application Priority Data
Feb. 23, 2007    (DE) .................. 10 2007 008 844

(51) Int. Cl.
*B29C 49/04*    (2006.01)
*B29C 49/78*    (2006.01)

(52) U.S. Cl.
USPC .......... 264/514; 264/510; 264/515; 264/40.6; 264/40.7; 425/72.1; 425/532

(58) Field of Classification Search
None
See application file for complete search history.

(56) References Cited

U.S. PATENT DOCUMENTS

| | | | |
|---|---|---|---|
| 3,920,365 A * | 11/1975 | Mules .......................... | 425/141 |
| 4,047,868 A * | 9/1977 | Kudo et al. ................ | 425/133.1 |
| 4,425,290 A * | 1/1984 | Upmeier ...................... | 264/40.1 |
| 4,978,484 A * | 12/1990 | Takashige et al. .......... | 264/40.1 |
| 6,409,494 B1 | 6/2002 | Voss | |
| 2006/0275523 A1 | 12/2006 | Marzano | |

FOREIGN PATENT DOCUMENTS

| | | |
|---|---|---|
| DE | 41 15 229 A1 | 11/1992 |
| DE | 198 23 304 A1 | 12/1999 |
| DE | 10 2004 001 473 A1 | 6/2005 |
| EP | 0 435 786 A2 | 7/1991 |
| GB | 418155 | 10/1934 |
| JP | 2006 188 018 A | 7/2006 |

OTHER PUBLICATIONS

Lee, Norman C. Practical Guide to Blow Molding. Shrewsbury: Rapra Technology Limited. 2006. pp. 103-106.*

* cited by examiner

*Primary Examiner* — Monica Huson
(74) *Attorney, Agent, or Firm* — Jacobson Holman PLLC

(57) ABSTRACT

A blow head for production of a multilayer blown film with at least two plastic layers has melt guide areas, which are traversed in succession in the direction of flow (z) of the melt, including feed lines to at least two individual gaps for guiding an individual stream, and an annular gap for combining of the film composite. At least one thermocouple is arranged on at least one flow path of at least one individual stream before the stream reaches the annular gap.

13 Claims, 10 Drawing Sheets

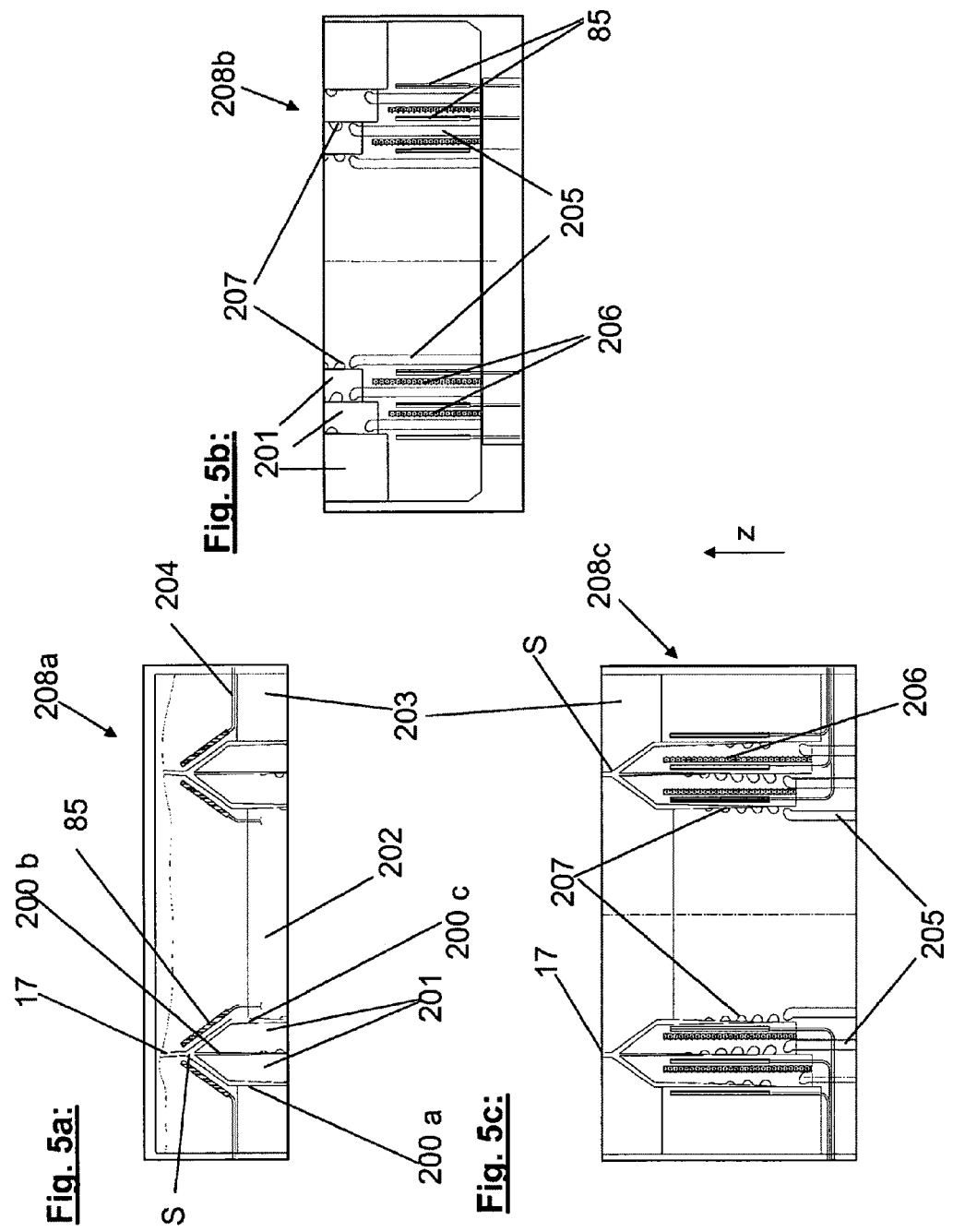

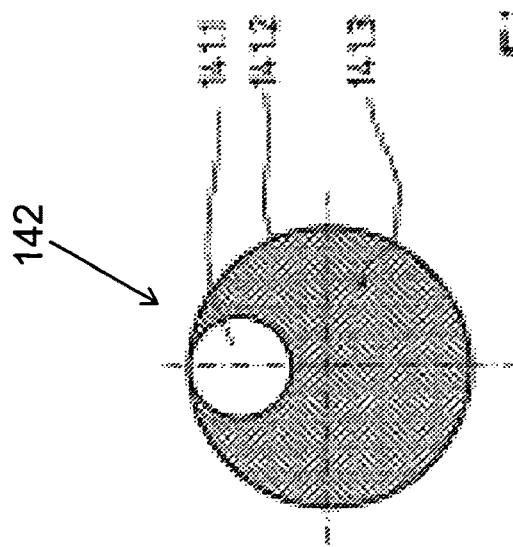
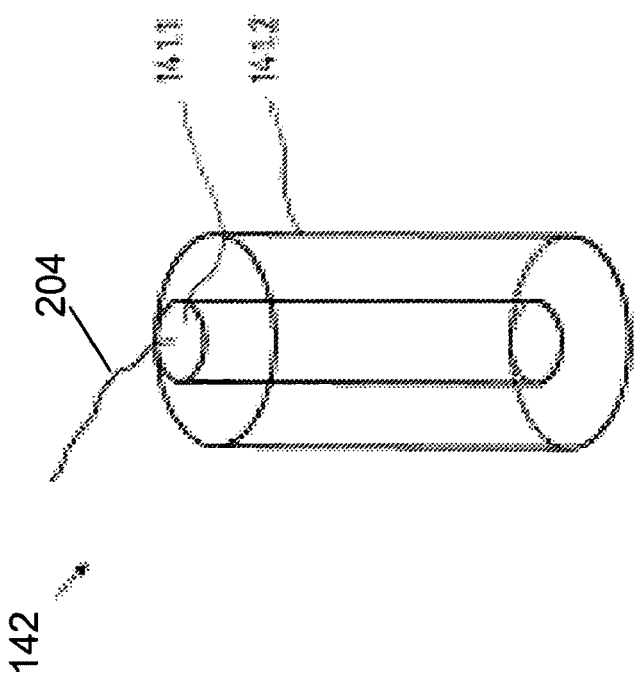

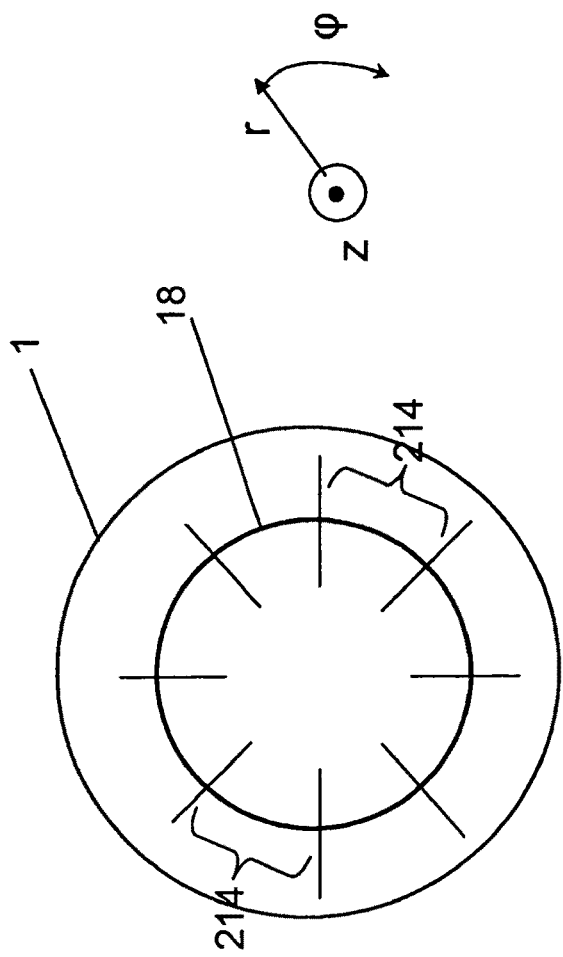
Fig. 8    Section VIII-VIII of Figure 1

MANIFOLD-TYPE DIE FOR THE PRODCUTION OF A MULTILAYER BLOWN FILM

CROSS-REFERENCE TO RELATED APPLICATION

This is a national stage of PCT/EP08/051,055 filed Jan. 29, 2008 and published in German, which has a priority of German no. 10 2007 008 844.4 filed Feb. 23, 2007, hereby incorporated by reference.

BACKGROUND OF THE INVENTION

1. Field of Invention

The invention concerns a blow head for a multilayer film. Blow heads are known. Blown films are extruded with them in blown film extruders.

2. Description of the Prior Art

For this purpose, one or more extruders convert a plastic extrudate to a plastic melt, which is fed to the blow head. For this purpose, melting lines are used, which connect the extruder or extruders to the blow head. Generally, the corresponding melt lines continue in the blow head. However, here they discharge in gaps within the blow head. In blow heads for production of multilayer film, several such gaps are provided in each blow head to guide a single stream. The individual layers in these gaps are actually formed. For this purpose, the individual layer or individual stream is converted from the cylindrical shape in the feed line to a flat shape in wind-up. In high-grade blow heads, the conversion can be conducted by guiding the melt line in the peripheral direction ($\phi$) of the blow head or the film tube and then grading it into the flat single gap. The feed line can then grade as a coil or sleeve into the gap. The zone, in which this transition occurs, is called the melt distribution zone in this document.

Often, but not always, a flow zone is connected to this zone, in which the melt flows along the gap for guiding an individual stream and, in this case, is even more strongly "accustomed" to the new flat shape. Blow heads are also known, in which a feed line grades directly into a flow zone without an extra pronounced melt distribution zone. Finally, the gaps to guide an individual stream in blow heads for production of multilayer films discharge into a gap for combining the film composite, which is ultimately designed as an annular gap. The different film layers adhere to each other in this annular gap. The annular gap ends on the round extrusion nozzle, at which the melt tube leaves the blow head.

It is also known from DE 10 2004 001 473 A1 to measure and control the thickness of the entire film in such blow heads. For this purpose, electrically operable cartridge-type heaters are arranged in the vicinity of the annular gap. These are in thermal contact with the melt and are capable of supplying heat selectively to sectors of the peripheral surface of the melt tube.

They are activated when a measurement device that measures the film thickness on the periphery of the extruded film tube finds a thick site in such a sector of the peripheral surface. Heating of the melt of the corresponding sector increases its stretchability, so that the corresponding sector is stretched out more strongly by the internal pressure in the bubble than the untreated sectors. Stronger stretching out eliminates the thick site.

It is known from EP 0 435 786 A2 to influence the temperature of individual melt layers overall by massive cooling. In this way, it is supposed to be possible to connect individual layers with strongly different processing temperature relatively damage-free into multilayered film by cooling the hotter processed melt layer before it is supplied to the more heat sensitive film.

Multilayer films have different film layers from sometimes high-grade film material.

SUMMARY OF THE INVENTION

The task of the present invention therefore consists of proposing a blow head, with which the thickness of individual layers within the film composite can be deliberately influenced.

This task is solved in that at least one thermocouple is arranged on at least one flow path of a single stream before reaching the annular gap.

This wording means that in the immediate spatial vicinity (in the area just a few centimeters away from the melt stream of the single stream) of a single stream, at least one thermocouple is arranged, i.e., a component, with which the temperature of these surroundings can be influenced. Naturally, the thermocouple is effectively connected (thermally) to the single melt stream. Generally, this thermal connection is produced at least partly by the component that limits the single melt stream. This means it is advantageous to introduce the thermocouple into the plate or deflection piece that limits the gap to guide a single stream on one side. However, thermocouples can also be mounted on such a component with contact to the melt.

In this case, the thermocouple is mostly in effective connection with the single melt stream, on which it acts preferably in the feed line to the single gaps or in the single gaps. The at least one thermocouple will therefore lie at the level of the feed line or the single gap in the flow direction of the melt. "In the flow direction at the level" means that the thermocouple is preferably effectively connected to the corresponding section of the melt flow path (preferred effect connection=better heat transfer to this part of the melt path of the corresponding single stream than to another part or another single stream).

This statement is important, since there are different types of blow heads and since, in some of these parts, the direction in which the melt flows repeatedly changes. These circumstances will be taken up further below with reference to the figures. In comparison with influencing the thickness of an entire film composite or a single-layer film, some surprising differences emerge here:

In the overall film thickness, the stretchability of the film as physical quantity is influenced by introduction of temperature. Heating eliminates a thick site on the film periphery and therefore acts against the film thickness.

In a method according to the invention, the viscosity of the melt is changed in the blow head. Heat input increases the viscosity (preferably with reference to a selected location on the film periphery), which means that more melt volume flows per unit time at the same pressure. The flow rate increased in this way leads to greater thickness of the film layer (preferably of a selected location on the film periphery).

The temperature of the melt is influenced on a single stream section with at least one thermocouple. For this purpose, the thermocouple is effectively connected to a section or sector of a melt flow path. Individual thick sites or thin sites can be eliminated (in sectors) on the film periphery. Heat input of a melt flow section (by a thermocouple) increases its viscosity, so that more melt volume emerges per unit time from the annular gap at the same pressure and a greater film thickness is produced on a certain peripheral section. In the reverse procedure, the opposite effects are observed.

After appropriate measurement of the thickness of a single layer, control of its thickness (preferably with the objective of uniform thickness of the single layer) can be conducted. The physical quantities influenced by the two methods are therefore different and effects of a temperature input are diametrically different.

As already mentioned, the individual gaps of high-grade blow heads often have a melt distribution zone and a flow zone. In the melt distribution zone, the melt feed line grades into the individual gap, in which the melt stream is converted from the frequently cylindrical shape of the melt feed line to a flat shape, which largely corresponds to the later film layer.

In the transitional area, the feed line often assumes a coil or sleeve shape. The coil or sleeve is opened at least in the direction of the melt stream to the gap. The coil or sleeve generally runs in the peripheral direction of the blow head. The coils, in particular, here have a corkscrew shape. Coils and sleeves taper in the direction of melt transport, while the individual gap becomes wider. Finally, the coil or sleeve ends and with it the melt distribution zone of the single gap.

Generally, a flow zone is connected to the melt distribution zone, in which the melt flows through the gap, maintaining its new shape, and is almost "accustomed" to its shape. Finally, the gap for guiding an individual stream discharges into a common gap, in which all melt streams are combined.

For many applications, it has proven advantageous if at least one thermocouple is arranged in the melt transport direction very close in front of the discharge of the melt into the common gap. Distances from 3 to 25 centimeters, better from 5 to 18 centimeters, are considered as advantageous ranges.

It is generally advantageous in the individual gap, but especially in the flow area, if the at least one thermocouple is aligned "obliquely" to the trend of the individual gap. "Obliquely" in this context means the following:

The shortest path between the transition point of the melt into an individual gap and the discharge of the individual gap into the annular gap for combining the film composite is a straight line (geometrically rather a line segment), which runs parallel to the axis of symmetry of the circular cylinder or truncated cone in individual gaps that have a truncated cone or circular cylindrical shape. If such an individual gap has the shape of a circular disk, as in a blow head constructed according to the so-called stack-die principle, these line segments then run from the transition point of the melt to the center of a circular disk. Alignment of the thermocouples (or their longitudinal axes) parallel to these line segments is advantageous. However, it is even more advantageous to provide an angle $\chi$ greater than 0° between these line segments and the thermocouples. Preferred angles between the longitudinal axis of the thermocouples 85 and coil 15 lie between 0° and the size of the angle between sleeves or coils and the line segment 100.

Through this expedient, the generally cylindrical thermocouples stretched along the cylinder axis can act on the plastic melt along its actual flow direction: as long as plastic melt of a single stream (or a single layer) is guided mostly in a melt feed line or sleeve or coil, it is generally advantageous to arrange at least one thermocouple parallel to the trend of this melt path segment. At the latest, at the end of the melt distribution zone, however, the flow direction of the melt changes: within the coils or sleeves there were determining components of melt movement in the peripheral direction of the blow head. On leaving the sleeve or coil, however, the melt begins to move increasingly more strongly along the line segment that marks the shortest path between the location of the transition of the corresponding melt segment and the single gap and the discharge of the single gap into the annular gap to guide the film composite (see above). A generally undesired mixing of different melt layers in the gap or annular gap, in which these layers are combined, is prevented, if the movement components in the peripheral direction of the blow head have largely degraded up to discharge of the gap for guiding a single stream into the gap or annular gap.

If alignment of the at least one thermocouple corresponds to the actual melt movement at this level in the flow direction of the melt, a surface segment of the later film tube is influenced by the effect of the thermocouple, which lies in a restricted and spatially clearly outlined angle range of the film tube (the angle coordinates φ in the peripheral direction of the film tube are meant in the cylindrical coordinate system of the film tube). Thick or thin sites of the bubble can be influenced in the peripheral direction in sectors on this account.

As already mentioned, there is an advantageous possibility of positioning the thermocouples in the components of the blow head that guide the single stream. Before the single streams (i.e., the melt streams that each form the single layer in the film) reach the corresponding discharge into the common annular gap, they mostly pass through the feed lines for the individual gaps and the individual gaps themselves. The components that limit the individual gaps are called the distributing die for purposes of this document. In stack-die blow heads, the components that limit the individual gaps are often called plates, in blow heads with a central pre-distributor, they are often called deflectors. The term distributing die is therefore the general term for "plates" and "deflectors."

These distributing dies often limit two different, preferably adjacent gaps for guiding a single stream. In this case, it is expedient to configure thermal connection of the thermocouple, so that heat transfer to one single stream (if possible) is much better than to the other. In this way, selective and exclusive influencing on a melt layer is strengthened.

This different heat transfer can be carried out by asymmetric positioning of the thermocouple in or on the distributing die. The use of material of (sharply) different thermal conductivity also offers possibilities here of producing heat transfer of different intensity.

In addition to additional heating, cooling of the melt during performance of the process also works. In view of the high amounts of heat energy that are to be supplied or withdrawn in a short time, in order to deliberately alter the viscosity of the melt, the choice of appropriate thermocouple is not simple.

Cartridge-type heaters and Pelletier elements are considered, among others. These can already form the thermocouple. However, it is advantageous to construct a thermocouple from a preferably elongated (cylindrical is very good) base element. This can be made from a material having a lower heat conductivity than the distributing die. An active (for example, Pelletier element or cartridge-type heater, "active element") or passive (for example, tempering agent line) heat source or sink can be arranged in this base element. In order to configure heat transfer to the adjacent single streams differently, an asymmetric arrangement of heat sources and sinks in such a base element is advantageous.

As already mentioned, it is necessary for deliberate control of local layer thicknesses distributed over the film periphery in the φ direction to influence only partial areas (sections) of a melt layer and thereby to leave the other layers largely uninfluenced. It is proposed for this purpose to position the thermocouples as close as possible to the layer being influenced, i.e., just beneath an outer surface on the distributor element, and then to provide a heat-insulating layer on the other side that at least limits the effect of the thermocouple on the adjacent layer.

It is then also useful to arrange the thermocouples for the innermost melt layer on the central base part, on which no more layers are influenced.

For the film layer lying outside, it is again favorable to arrange thermocouples in the inner surface of the outermost distributing die, since, from the outside in, no more flow paths exist to be influenced. Careful thermal separation must therefore be carried out only in the middle distributor elements.

The thermocouples are preferably designed as tubular or cylindrical cartridge-type heaters, which are common and, because of their cylindrical outer shape, have the additional advantage that they can be simply inserted into holes. The use of relatively longer cartridge-type heaters is therefore also possible, which permit an influence on the viscosity over a larger flow path.

The cylindrical cartridge-type heaters are advantageously not directly inserted into receiving holes on the distributing die, but in cylindrical support bushings, in which the cartridge-type heater is then arranged eccentrically. The distance of the thermocouple to the outer surface can be varied by the eccentricity. At the same time, the free volume of the support bushing has a heat-insulating effect.

The heating element can be mechanically fastened in the support bushing, so that a gas-filled empty space remains. The empty space can also be filled with a heat-insulating material, for example, an insulating foam.

To uniformly distribute heat input on the periphery by as many thermocouples as possible, but, on the other hand, to keep the cost for controlling the heating elements within limits, several thermocouples can be combined into groups, which are then selectively controlled. In order to set a temperature gradient, however, it can also be advantageous to control all thermocouples simultaneously, but with different power.

It is then advantageous to provide a control device that can control the individual thermocouples independently of each other. It is also advantageous if this control device contains information on the "thickness distribution" of the blown film present over the peripheral direction. This information can be sent to the control device as a signal via appropriate data lines or frequencies. The single layer thickness in individual sectors of the periphery of the multilayer film tube can thus be deliberately influenced. Control of the thickness of the single layer, with the objective of keeping it uniform over the periphery of the film tube at a target value, is therefore possible.

Against the background of the aforementioned relations between temperature input or cooling and thickness of a single layer, the following advantageous control methods are conceivable:

On detection of a local thin site, the melting temperature can be increased for the corresponding sector, so that the melt flow can be increased and the thin site eliminated. Cooling of the remaining areas appears possible, but more difficult for technical reasons.

A local thick site can be eliminated by cooling. Here again, however, it appears more advantageous for technical and physical reasons to drive the thermocouples of all sectors initially with an offset temperature and to lower the temperature in the sector or sectors in which thick sites occur. The offset should advantageously be chosen, so that in the case of thin sites, additional potential for local temperature increase and therefore elimination of even a thin site still exists.

As in all process steps presented in the present document, it is also advantageous in controlling the film thickness, if the method is conducted by a control device (computer-implemented). In this case, the control device is preferably set up by program commands, so that they can operate the corresponding process steps by controlling the corresponding functional components of the blow head and/or the extrusion unit.

It is advantageous to measure the thickness of the blown film single layers right after their extrusion. If the blow film is to be flattened out and wound up, this can occur before winding. For this purpose, one or more probes can again be used, which enclose the peripheral surface of the blown film. It is advantageous to use at least two different measurement principles. The total thickness of the film could be measured capacitively, while the thickness of a specific single layer is measured by absorption of radiation (for example, electromagnetic radiation or beta radiation).

BRIEF DESCRIPTION OF THE DRAWINGS

The invention is further explained below with reference to the drawings. The individual figures show:

FIG. 5a to c cutouts of sections through additional blow heads

FIG. 7a a thermocouple in a schematic perspective view and

FIG. 7b a thermocouple in section

FIG. 8 a section VIII-VIII through the blown film according to FIG. 1

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
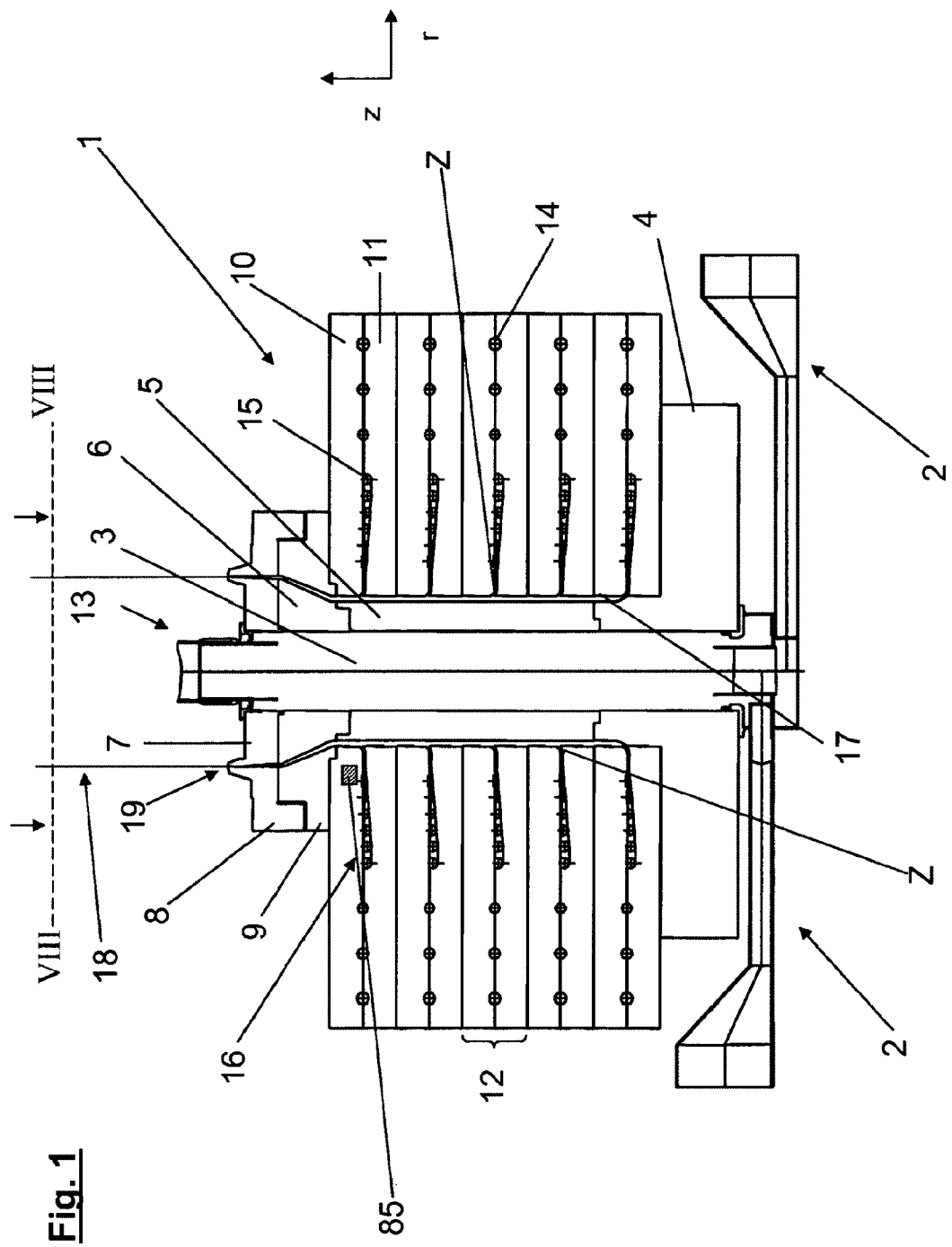
FIG. 1 a section through a stack-die blow head

FIG. 1 shows a section through a stack-die blow head 1. The sectional plane is spanned by the axial and radial coordinates z, r of the blowing head. The axial component z simultaneously shows the feed direction of the melt in the gap to supply several single layers. The stack-die blow head 1 is supported on a foot 2, which simultaneously contains part of the infrastructure required for the blow head (cooling air, power, sensor and control lines). The part of the infrastructure intended for the interior of the blown film grades into the internal tube 3, which conveys the air for internal cooling to internal cooling 13. The internal tube 3, in turn, runs within the lower 4, middle 5 and upper 6 inner core of blow head 1. The inner cores 4, 5, 6 also delimit the nozzle gap for guiding several single streams 17 inward and form the blow head interior in the radial direction r of blow head 1.

The melt is fed to the depicted stack-die blow head in the radial direction r from the outside, the lines running outside the blow head 1 not being shown. Further guiding of the melt in the blow head is assumed by the melt feed lines or radial distribution lines 14, which can only be seen in cross section in the present sectional drawing (FIG. 1). It is not shown that the trend of these lines 14 also has radial components r, so that the lines 14 feed the melt to the coils 15 and the second gaps for guiding a single stream 16.

The lines 14, coil 15 and second gaps 16 in the depicted practical example of a stack-die blow head are bounded by the upper and lower plate 10, 11 of a radial distribution slot 12. The depicted blow head 1 has five such radial distribution slots 12 and therefore five such gaps to guide several single streams 16. All these gaps discharge in the gap to guide several single streams 17 (annular gap), in which different melt streams are combined to a composite. In the depicted practical example, the melt is moved in this gap in the z direction and therefore the flow direction changes relative to the individual gaps 16 by 90°. At the axial end of the blow head, the melt composite passes through the nozzle 19 formed by the inner and outer extrusion lips and cools to a film 18.

The discharge points of gaps 16 for guiding the individual streams in the common gap 17 are denoted Z here. In the running direction of the melt in the individual gaps (here they run in FIG. 1 in the r direction toward the center of the blow head), a thermocouple 85 is positioned in front of one of these discharge points Z. It shows a favorable position for such an element.

Figure 2A:
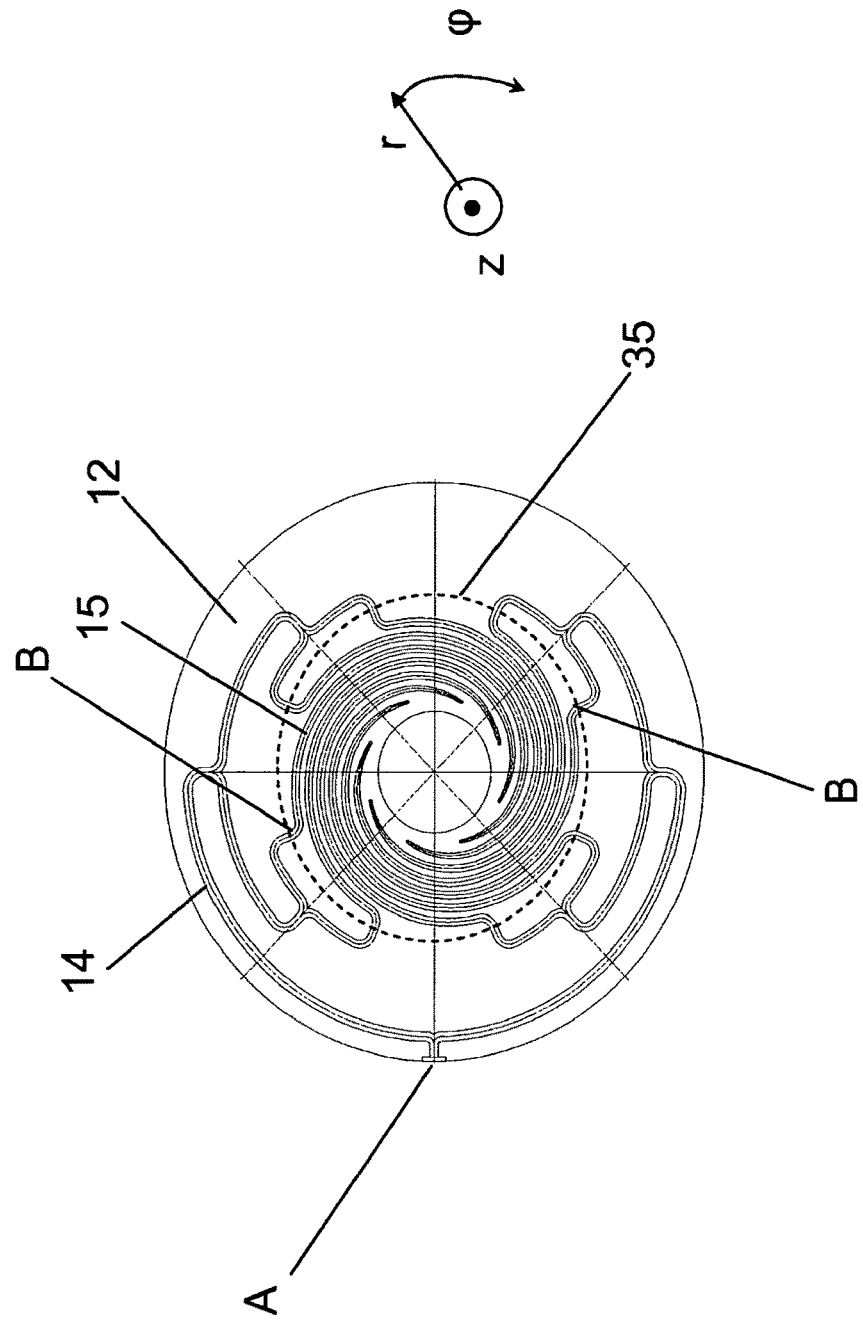
FIG. 2a a section through a radial distribution insert of a blow head
Figure 2B:
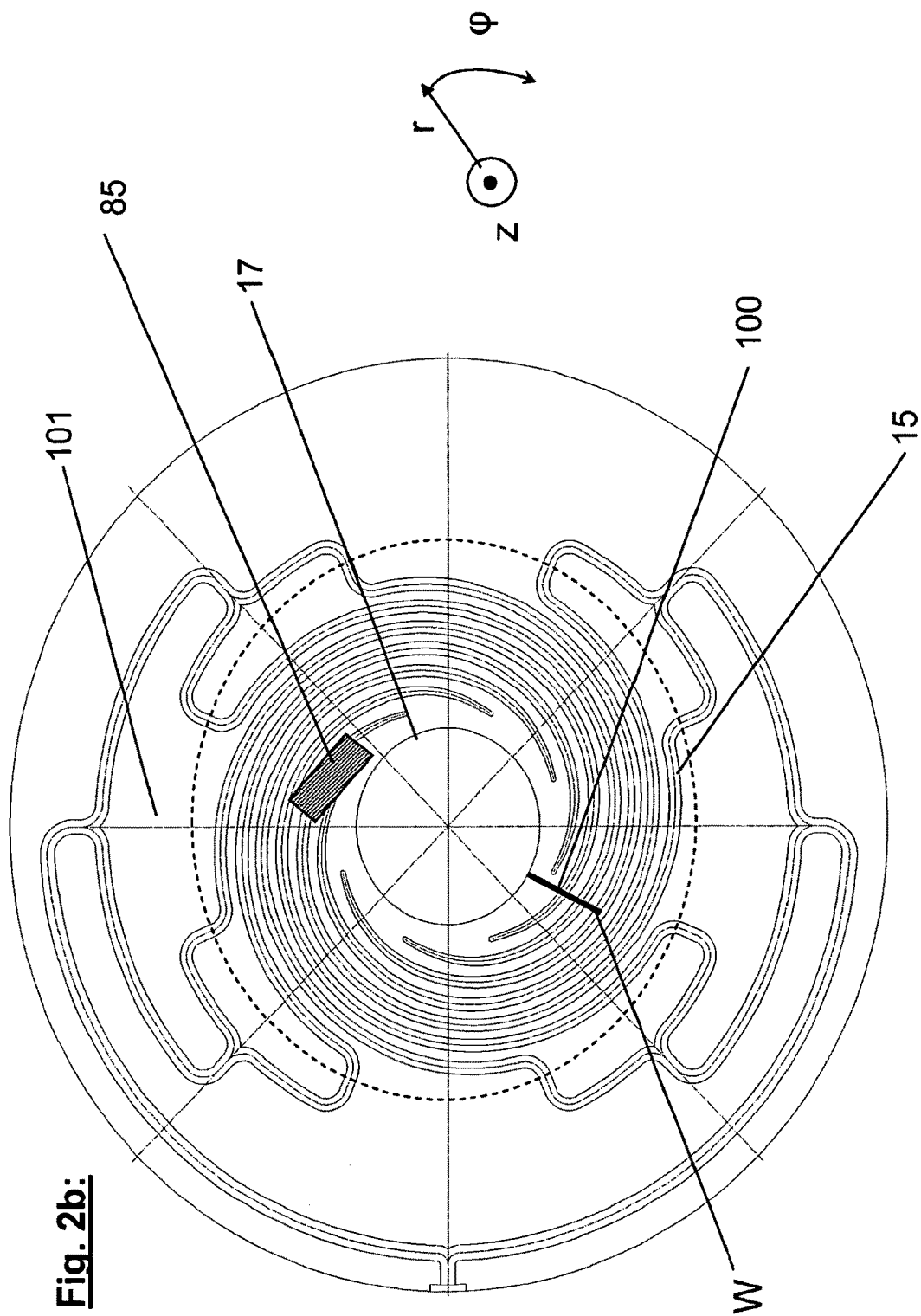
FIG. 2b the same cutout as in FIG. 2a on a larger scale

FIG. 2a shows a trend of the melt lines 14, often referred to as antlers, in a radial distribution slot 12. FIG. 2 here is to be understood as a section through such a radial distribution slot 12. The sectional plane is spanned by the radial r and angular coordinates φ of the blow head. The specific type of trend and branches of the radial distribution line 14 is similar to antlers. Initially, the melt is transferred at transfer point A from a line (not shown) running outside the blow head, preferably between an extruder and the blow head 1, to the radial distribution line (melt feed lines) 14 running inside the radial distribution slot 12 and therefore inside blow head 1. This radial distribution line is branched, in order to bring the melt as uniformly as possible to different sites on the second gap 16 for guiding an individual stream. On reaching this gap 16 at point B, the melt line 14 grades into coil 15 in the present practical example.

FIG. 2b again shows the same cutout as FIG. 2a, in which the position of a thermocouple 85 is indicated. The line segment 100 denotes the shortest path between point W and the common gap 17. An amount of melt leaving coil 15 through overflows of point W and heading toward gap 17 through individual gap 16, however, does not move along the line segment 100. Instead, its movement still has angular component φ, which it gradually loses through friction. The thermocouple 85 is therefore arranged "obliquely." The angle between the longitudinal axis of thermocouple 85 and coil 15 is smaller than the angle between this line segment 100 and coil 15. It therefore lies between 0° and the aforementioned angle between coil 15 and line segment 100. For graphic reasons, the depiction of a number of thermocouples 85 along the periphery of gap 17 was dispensed with.

Figure 3:
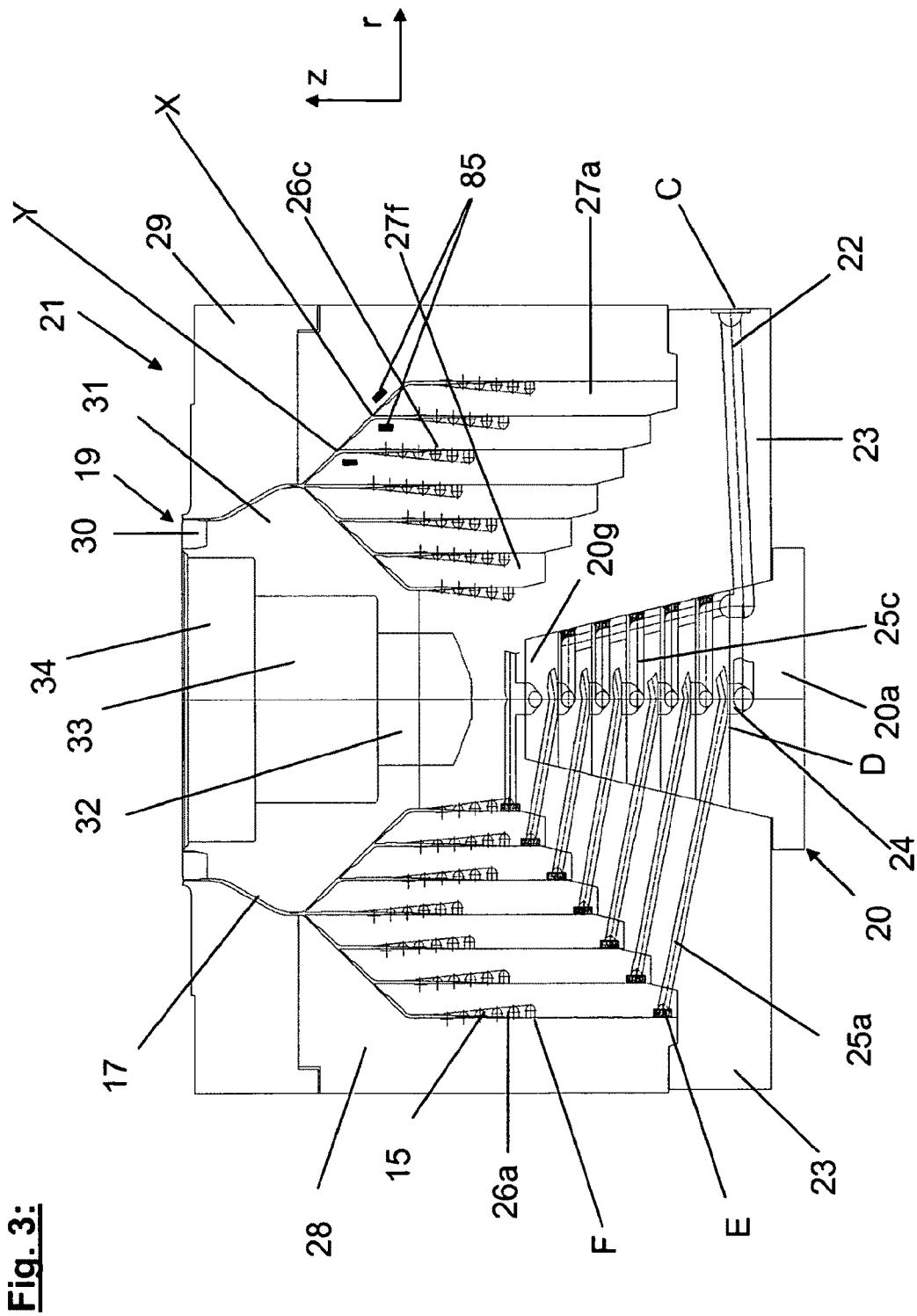
FIG. 3 a section through a blow head with central pre-distributor

FIG. 3 shows a blow head 21 with a central pre-distributor 20. Characteristically, this is situated at the foot of the blow head and is arranged centrally in the radial direction r. The melt is fed via main melt lines 24 a to f to the central pre-distributor 20. For graphic reasons, only one representative melt line 24 is shown. The pre-distributor here consists of different components 20a to 20g arranged layer-like, one above the other. A central cavity 24 a to f is also assigned to each later melt layer, in which the corresponding main melt line 22 a to f discharges. The melt distribution lines 25 a-g branch off from these cavities 24 a to g. It should be noted that several melt distribution lines branch off from each cavity, only one of which is shown. This expedient also has the objective of supplying the first gap for guiding a single stream 26a to 26g as uniformly as possible with melt along its extent in the direction of angle coordinate φ.

On reaching these gaps 26a to 26f, the melt distribution lines 25 a-f grade into coils 15. After the individual streams of melt in gaps 26a to 26g have been brought to their flat shape, they reach the nozzle gap for guiding several individual streams 17 and are finally extruded through nozzle 19.

The following must also be said concerning the mechanical structure of this blow head 21: the central pre-distributor 20 is enclosed by the main deflector 23.

The gaps for guiding an individual stream 26a to 26f are formed by the main deflector 23, the deflectors 27 a-f and jacket 28.

The nozzle gap 17, before discharging into the atmosphere, is bounded by inner core 31, inner ring 30 and outer ring 29. The inner core 31 has several inner parts 32 to 34.

Generally, the favorable sites for positioning of thermocouples are situated right in front of the discharge points of the gaps for guiding the individual streams 26 a f into the common gap 17. In the case of the first gap 26 a, which grades into common gap 17, the discharge is assumed at point X.

Point Y of discharge is shown as representative for the other gaps for gap 26 c. The thermocouples 85 are mounted at favorable points directly in front of the discharges. They symbolize only favorable installation locations. It is possible to provide all gaps for guiding an individual stream with thermocouples. The thermocouples are then advantageously distributed in larger number of the periphery of the blow head.

Figure 4:
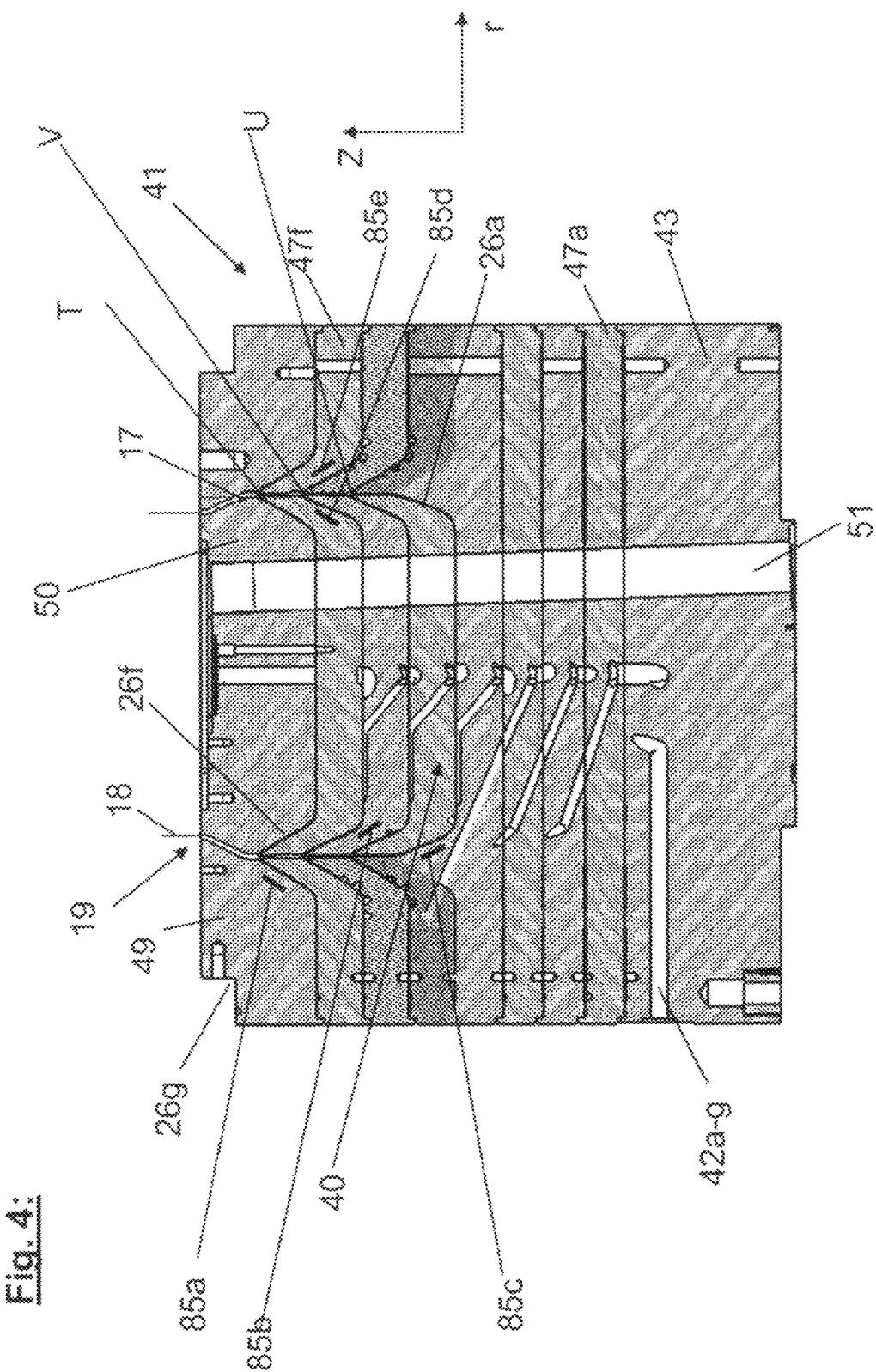
FIG. 4 a section through an additional blow head with central pre-distributor

The mechanical structure of the blow head 41 in FIG. 4 initially acts more clearly than the mechanical structure of blow head 21:

The additional deflectors 47 a-f are arranged above the main deflector 43. The outer ring 49 and inner ring 50 follow these deflectors. The inner tube 51 provides a position for the feed lines for the interior of the bubble 18.

The gaps for guiding an individual stream 46 a to f are again bounded by the deflectors 43 and 47 a-f and rings 49, 50. In comparison with blow head 21, it is conspicuous that the gaps for guiding an individual stream 47 b to f discharge on both sides of the melt flowing through the nozzle gap for guiding several individual streams 17. Only the first individual gap 26 a in the main flow direction z of the melt grades directly and therefore separately into nozzle gap 17.

As discharge point into the annular gap, point U, at which the individual gaps 26 a and b meet, is therefore assumed for individual gap 26a. As in the preceding examples, it is also favorable here, if the thermocouple 85 c is arranged close and before this point U in the vicinity of gap 26a. In the depicted practical example, the thermocouple has a preferred thermal effect zone on the flow zone of gap 26a. The other thermocouples 85 a, b, d, e are also introduced directly in front of the discharge points U and V of the corresponding individual gaps 26 b to f.

In this way, it is also possible to combine seven melt layers, but to keep the distance between discharges of the individual gaps 26 a to f in nozzle gap 17 and the outlet of the melt from nozzle 19 much smaller than in blow head 21. This circumstance spares the film material.

The blow head 41 depicted in FIG. 4 also has a central pre-distributor 40, in which this does not include different components assigned exclusively to it, like the pre-distributor 20 in blow head 21 with its parts 20 a-g. Instead, the central pre-distributor 40, designated merely with an arrow, is prominent as component of the main deflector 43 and deflectors 47 a-f.

A comparison of the two blow heads 21 and 41 or pre-distributors 20 and 40, however, reveals the basic functional common features.

The main melt lines 22 a-f or 42 a-f bring the melt to cavities 24 and 44 a-f, which are positioned in the radial direction r of the blow head best precisely in the center of the nozzle ring. In the depicted practical examples, the main melt lines mostly run in the radial direction r. However, it also appears possible to supply the cavities through main melt lines running mostly in the z direction.

These cavities supply melt distribution lines 25 and 45 a-f, which generally branch off star-like from the cavities and again discharge into the first gaps 26 for guiding an individual stream. The reason for central positioning of cavities 22, 44 in the central pre-distributor is that the different melt distribution lines 25 or 45, branching off star-like from a cavity, which guide a melt stream and discharge in a gap 26 for guiding an individual stream, are equally long from the cavity to the gap. In this way, the melt of an n-th melt layer experiences the same pressure loss in all melt distribution lines 25a-f and 45a-f assigned to it. In this way, the desired film quality can be assured.

Generally, the cavities 24 a-f or 44 a-f lie in the z direction beneath the beginning of gaps 26 a-f.

FIGS. 5 a to c again illustrate preferred incorporation positions of the thermocouples 85 in blow heads 208 a to c, whose other mechanical structure is identical and similar to the blow head 21 depicted in FIG. 3. The path of the melt in these blow heads is bounded by the central deflector 202, the deflectors 201 and the jacket 203. The melt flows through a central pre-distributor (not shown) into melt feed lines 205, which grade into coils 207. These release the melt by overflow into the individual gaps 200 a, b, c. At point S, the individual gaps join to a common annular gap 17. The melt flows further and leaves the blow head 208 a to c through a nozzle lip that is already no longer shown. In blow head 208 a in FIG. 5a, the thermocouples 85 are again positioned in the vicinity of the discharge point S. Thermocouples are only assigned to the outer individual gaps 200 a and c. This expedient is advantageous, if an influence on the two outer layers by temperature introduction on the middle layer in gap 200 b is to be avoided. The type of positioning of thermocouples 85 minimizes mutual influencing. Moreover, it is conspicuous that the area of effect of the thermocouples is obviously limited to the flow area of gaps 200 a and c, since the coils 207 already end earlier in the flow direction of the film (here z). The lines 204 symbolize power and/or signal feed lines.

A cutout of an essentially similarly constructed blow head 208 b, showing the melt feed lines 205 to the individual gaps 200 a to c, is depicted in FIG. 5b. In this practical example, the thermocouples 85 are mounted already in the immediate vicinity of the melt feed lines 205. They therefore lie in the running direction z in the melt well in front of the thermocouples 85 of blow head 208a. The insulation elements 206 must also be mentioned, which ensure that the size of the thermal effect of a thermocouple at least largely remains limited to an individual gap 200 b and c. The outermost gap 200 a in the radial direction r is selectively tempered by a thermocouple embedded in the jacket 203 of blow head 208 b. This thermocouple does not require any special thermal separation from another individual gap.

Relative to FIGS. 5a and b, FIG. 5c shows a middle part of a blow head 208c. Here the thermocouples 85 are positioned, so that they act directly on the melt distribution zone of gaps 200 a to c. Here the coils 207 grade into the individual gaps 200 a to c. The two inner thermocouples 85 are again separated thermally by insulation elements 206 from an individual gap 200 a, b. This expedient is unnecessary in the outer thermocouples arranged in jacket 203.

Figure 6A:
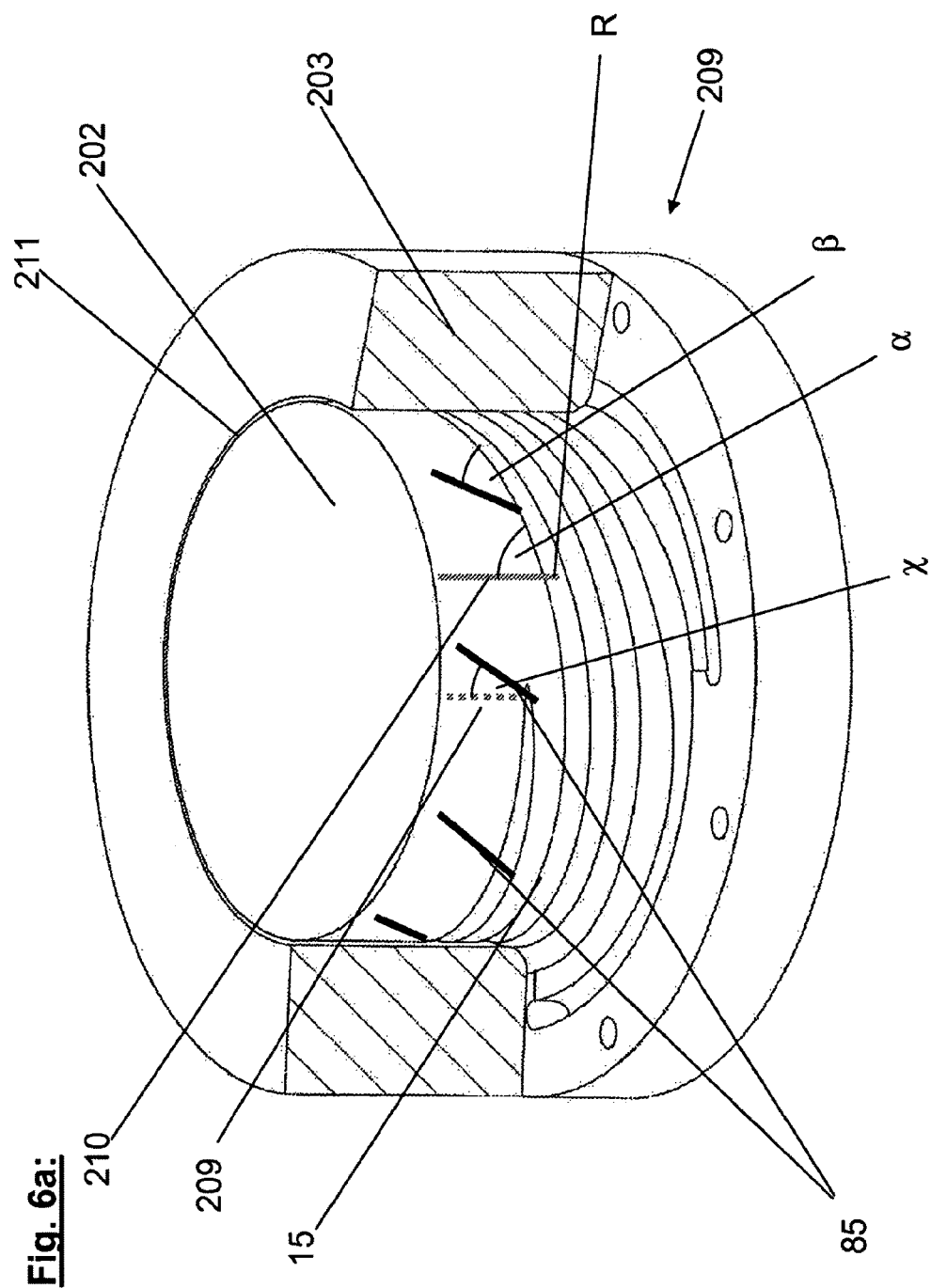
FIG. 6a a sketch of a single-layer blow head

FIGS. 6a and b show a single layer blow head 209. Significant concepts of the present document are to be explained again with these illustrative figures. A single gap 211 is formed in blow head 209 by the central deflector 202 and jacket 203. The central deflector 202 simultaneously serves as foot of blow head 209. The shortest path between point R, at which an arbitrary amount of melt leaves the coil 15 by overflow, and the end of the gap is the line segment 210. Between this line segment and the coil, an angle α is formed, which is greater than angle β between the longitudinal axis of the thermocouple 85 and the coil 15. Through this depicted "oblique" arrangement of the thermocouple, it is guaranteed that the longitudinal axis of the thermocouple is aligned largely parallel to the actually prevailing flow direction of the melt in gap 211. Naturally, this teaching can be transferred to the conditions in gaps 16 for guiding an individual stream in blow heads 1, 21, 208 a to c according to the invention. Here the line segment runs between a point of the coil and the discharge into the common annular gap. Here again, the angle between coils 15 and the cartridge-type heaters lies between 0° and the angle between the same line segment (for example, line segment 100) and coil 15.

Figure 6B:
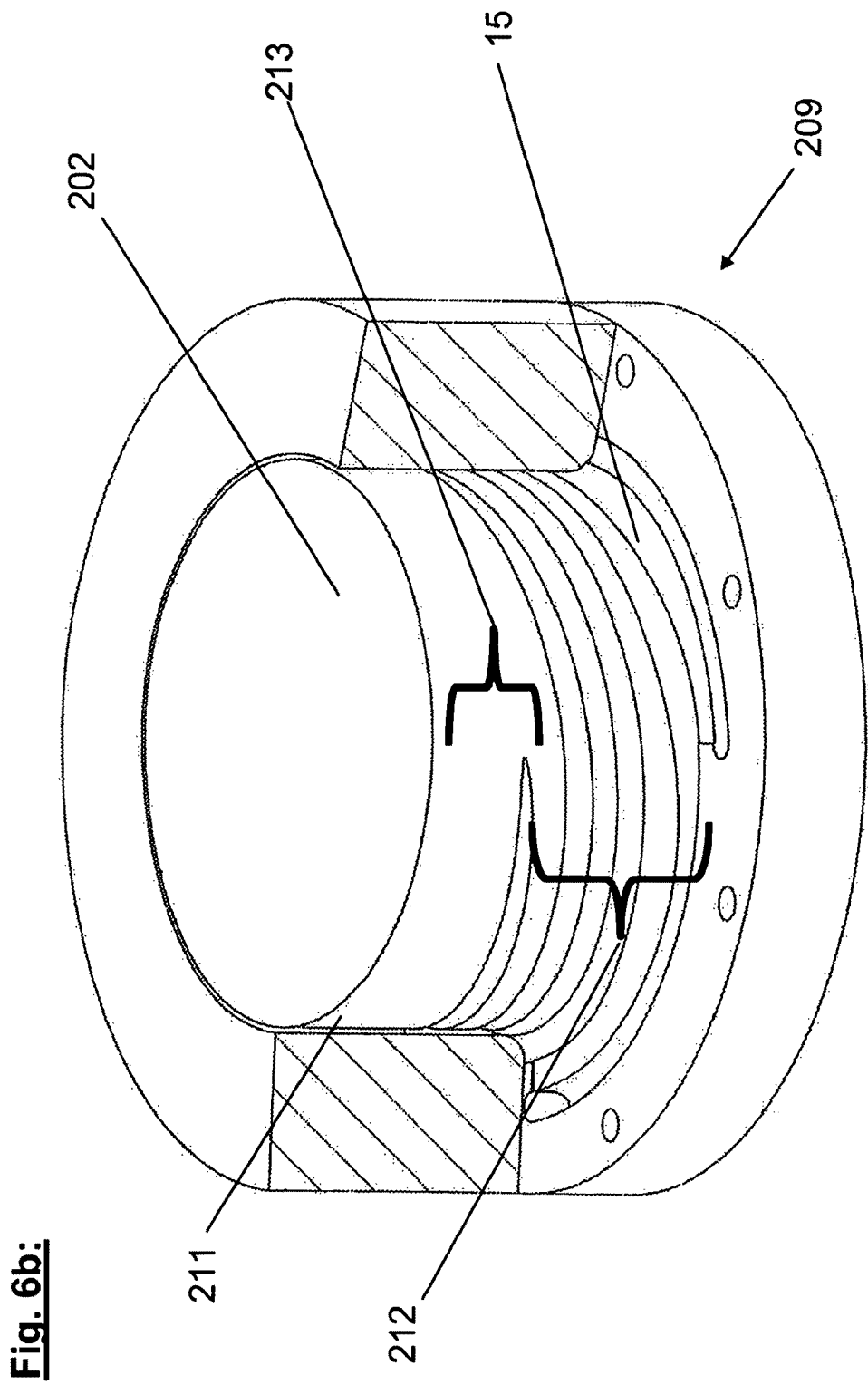
FIG. 6b a sketch of a single-layer blow head

The extent of the melt distribution and flow zone is again shown by the parentheses 212 and 213 in FIG. 6b. It is advantageous, if at least one thermocouple preferably acts on the melt distribution and/or flow zone.

FIG. 7a shows a thermocouple 141 in a perspective view. A thermal effect element 141.1, for example, a cartridge-type heater, is integrated in support element 141.2.

As shown in the top view of FIG. 7b, the cartridge-type heater 141.1 has a much smaller diameter in comparison to support element 141.2 and is arranged eccentrically in it, so that adjustment of the distance to the channels guiding the melt is possible.

FIG. 8 shows a section VIII-VIII through the bubble 18 according to FIG. 1. The sectional plane is spanned by the radial r and angular coordinates φ of the blow head. For graphic reasons, the foot 2 and inner cooling 13 of the blow head 1 are not shown. The sectors 214 are shown along the film periphery. By controlling the thickness of the individual layer, individual thick or thin sites of an individual polymer layer of the multilayer film that occur in such sectors can be eliminated. For this purpose, as already described at length above, the thermocouples 85 are selectively (or individually) controlled, in order to selectively influence the viscosity of the melt stream at certain sites. In the practical example of FIG. 8, 8 such sectors 214 are shown. Generally, fine control of thick sites or thin sites along the film periphery makes more than 8 sectors 214 necessary. It is naturally also possible to assign more than one thermocouple to one such sector. In order for the thermal effect of the thermocouple or thermocouples to act not only selectively on the thickness of the film or film composite, but also selectively or individually on the thickness of an individual layer, the thermocouple should be effectively connected to an individual melt stream before it reaches the common annular gap.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

List of reference numbers

| | |
|---|---|
| 1 | Stack-die blow head |
| 2 | Foot and feed part |
| 3 | Inner tube |
| 4 | Lower inner core |
| 5 | Inner middle core |
| 6 | Upper middle core |
| 7 | Inner nozzle lip |
| 8 | Outer nozzle lip |
| 9 | Outer core |
| 10 | Upper plate |
| 11 | Lower plate |
| 12 | Radial distribution slot |
| 13 | Inner cooling |
| 14 | Radial distribution lines |
| 15 | Coil |
| 16 | Second gap for guiding an individual stream |
| 17 | Nozzle gap for guiding several individual streams |
| 18 | Bubble |
| 19 | Nozzle |
| 20 a-f | Central pre-distributor |
| 21 | Blow head with central pre-distributor |
| 22 a-f | Main melt lines |
| 23 | Main deflector |
| 24 a-f | Cavity |
| 25 a-f | Melt distribution lines |
| 26 a-f | First gap |
| 27 a-f | Deflectors |
| 28 | Jacket |
| 29 | Outer ring |
| 30 | Inner ring |
| 31 | Inner core |
| 32 | Inner part of inner core |
| 33 | Inner part of inner core |
| 34 | Inner part of inner core |
| 35 | Dashed circle, indicating the radial extent of a second gap for guiding an individual stream |
| 36 | |
| 37 | |
| 38 | |
| 39 | |
| 40 | Central pre-distributor |
| 41 | Blow head with central pre-distributor |
| 42 | Main melt lines |
| 43 | Main deflector |
| 44 | Cavity |
| 45 | Melt distribution lines |
| 46 | First gap |
| 47 | Deflectors |
| 48 | Jacket |
| 49 | Outer ring |
| 50 | Inner ring |
| 51 | Inner core |
| 52 | |
| 53 | |
| 55 | Melt line |
| 61 | Blow head |
| 62 | Melt distribution lines (radial distributor) |
| 63 | Plates |
| 64 | Screw/fastening device |
| 66 a, b | Second gap for guiding of individual stream |
| 67 | Outer ring |
| 68 | Inner core |
| 69 | Refitting set |
| 85 | Thermocouple |
| 100 | Shortest line segment between point W and annular gap 17 |
| 141.1 | Thermal effect element |
| 141.2 | Support element |
| 142 | Thermocouple |
| A | Transfer point between outer (not shown) and inner melt line/radial distribution line 14 |
| B | Transfer point between melt line/radial distribution line 14 and coil 15 |
| R | Radial coordinates of blow head |
| Z | Axial coordinates of blow head |
| $\phi$ | Angle coordinates of blow head |
| S, T, U, V, X, Y, Z | Discharge point of an individual stream into a gap (often annular gap) for guiding several individual streams |
| W, R | Point on the trend of coil 15, at which an amount of melt passes into the individual gap 16 |
| 200 a, b, c | Individual gaps |
| 201 | Deflectors |
| 202 | Central deflector |
| 203 | Jacket |
| 204 | Line (power and/or signal, i.e., control) |
| 205 | Melt feed line |
| 206 | Insulation element |
| 207 | Coil |
| 208 a, b, c | Blow head |
| 209 | Parallels to 210 |
| 210 | Shortest line segment between point R and annular gap 17 |
| 211 | Individual gap |
| 212 | Parentheses, marking the melt distribution zones |
| 213 | Parentheses, symbolizing the flow zone |
| 214 | Sectors, in which thick sites or thin sites are controllable |
| α | Angle between the line segment 210 and coil 15 |
| β | Angle between longitudinal axis of the thermocouple and coil 15 |
| χ | Angle between line segment 211 and longitudinal axis of the thermocouple |

What is claimed is:

1. A method of producing with a blow head a multilayer blown film having at least two plastic layers, comprising the steps of:

feeding a melt to at least two individual gaps, with each of the individual gaps guiding an individual stream of the melt, and the individual streams each forming individual layers of the film, with at least one of the gaps that guide the individual stream having a melt distribution zone in which a melt feed line extends into the individual gap in a peripheral direction (φ) of the blow head;

transferring the melt into a flat form in the at least two individual gaps;

combining of the individual streams in a common annular gap; and influencing a temperature of at least one peripheral section of at least one of the individual streams after leaving an extruder and before reaching the annular gap with at least one of a plurality of thermocouples, with the thermocouples being arranged on or in a component which borders the individual gap and lies at least partially at a level of the individual gap in the direction of the melt stream, a thickness of at least one of the individual layers of extruded film and at least one sector that forms a partial area of a periphery of the blown film being controlled with the at least one thermocouple, with at least two of the thermocouples being assigned to different sectors that form the partial area of the periphery of the blown film, and with the at least two thermocouples assigned to the different sectors being controlled individually.

2. The method according to claim 1, wherein the thickness of the individual layers of the blown film is measured before a step of winding of the blown film, and the thickness is controlled by the temperature influence with the at least one thermocouple.

3. The method according to claim 1, wherein the thickness of the individual layers is determined with at least two sensors that use at least two different physical measurement principles.

4. A blow head for production of a multilayer blown film having at least two plastic layers, the blow head comprising at least melt-guiding areas, which are traversed in succession in a direction of flow (z) of a melt, including feed lines to at least two individual gaps, with each of the individual gaps guiding an individual stream of the melt, and the individual streams each forming individual layers of the film, with at least one of the gaps that guide the individual stream having a melt distribution zone in which a melt feed line extends into the individual gap in a peripheral direction ($\phi$) of the blow head, an annular gap in which the individual gaps discharge, and a plurality of thermocouples with which a temperature of surroundings can be influenced, at least one of the thermocouples being arranged on at least one flow path of at least one of the individual streams before the individual stream reaches the annular gap, with the thermocouples being arranged on or in a component which borders the individual gap and lies at least partially at a level of the individual gap in the direction of the melt stream, a thickness of at least one of the individual layers of extruded film in at least one sector that forms a partial area of a periphery of the blown film being controlled with the at least one thermocouple, with at least two of the thermocouples being assigned to different sectors that form the partial area of the periphery of the blown film, and with the at least two thermocouples assigned to the different sectors being individually controlled.

5. The blow head according to claim 4, wherein at least one of the gaps that guide the individual stream has a flow zone in which the melt is guided in a flattened form, the flow zone having a shape of a ring.

6. The blow head according to claim 5, wherein at least one of the thermocouples extends in the flow direction of the melt at least partially at the level of at least one of the melt distribution zone and the flow zone.

7. The blow head according to claim 4, wherein the thermocouples are arranged separated from the flow path of the melt by a wall area.

8. The blow head according to claim 4, wherein the thermocouples are arranged in a distributing die.

9. The blow head according to claim 8, wherein the thermocouples are arranged closer to a first outer surface of the distributing die than to a second outer surface of the distributing die, and are shielded by an insulation layer relative to the second outer surface.

10. The blow head according to claim 4, wherein at least one of the thermocouples includes at least one Pelletier element.

11. The blow head according to claim 4, wherein at least one of the thermocouples is formed by at least one channel that is traversable with a gas or a liquid.

12. The blow head according to claim 11, wherein the channel is associated with a thermocouple base element that is insertable into a recess of the distributing die.

13. The blow head according to claim 4, wherein the thermocouples are selectively controllable individually or in groups.

* * * * *